Patented Apr. 24, 1945

2,374,328

UNITED STATES PATENT OFFICE 2,374,328

PROCESS FOR PREPARING NITRO-Bz-1:Bz-1'-DIBENZANTHRONYLS

Clifford E. Carr, Carneys Point, N. J., assignor to E. I. du Pont de Nemours & Company, Wilmington, Del., a corporation of Delaware No Drawing. Application September 24, 1943, Serial No. 503,720

2 Claims. (Cl. 260—363)

This invention relates to an improvement in the process for preparing nitro-Bz-1:Bz-1'-dibenzanthronyl, which is an intermediate employed in the preparation of black vat dyes.

In U. S. P. 1,957,459 processes are described for the preparation of nitro derivatives of Bz-1:Bz-1'-dibenzanthronyl wherein the nitration is carried out either in organic solvents such as nitrobenzene, or in concentrated sulfuric acid of approximately 98% strength. However, in the nitration of the dibenzanthronyl in concentrated sulfuric acid, the resulting nitro derivatives are not identical with those produced by carrying out the nitration in organic solvents, for, on subsequent reduction and caustic alkali fusion to convert them to black dyes, the ones produced by nitration in the concentrated sulfuric acid give much greener shades of black than those where nitration was carried out in organic solvents. It is of course recognized that nitration in organic solvents is much more costly than where the nitration can be carried out in sulfuric acid, the difference being not only the cost of the solvent employed, but in the amount of nitric acid needed to effect the desired degree of nitration.

It is an object of the present invention to provide a process for preparing nitro derivatives of Bz-1:Bz-1'-dibenzanthronyl wherein sulfuric acid can be employed as the nitration medium, and which will give nitro derivatives that on subsequent reduction and fusion, as more particularly described in U. S. P. 1,957,459, can be converted to black dyes which do not have the pronounced greenish tinge characteristic of those prepared from the nitrodibenzanthronyls produced by nitration in concentrated sulfuric acid. A further object of the invention is to provide a simple and economical process for carrying out the nitration of Bz-1:Bz-1'-dibenzanthronyl and which can readily be combined with the preliminary oxidation and, if desired, with subsequent reduction steps, thereby obviating the necessity for isolating intermediate products, which is not only costly in time, but which invariably entails the loss of some material in handling.

I have found that where Bz-1:Bz-1'-dibenzanthronyl is nitrated with nitric acid in sulfuric acid of from 80% to 86% strength, a dinitro derivative is obtained which can be converted to a black dye of satisfactory shade and which has improved fastness properties as compared with those obtained when the nitration is carried out in concentrated sulfuric acid. The dinitro-Bz-1:Bz-1'-dibenzanthronyl obtained by this process is similar in shade to that obtained by solvent nitration of Example 1 of U. S. P. 1,957,459.

By carrying out the nitration in sulfuric acid, it is possible to combine this step with the oxidation step wherein the Bz-1:Bz-1'-dibenzanthronyl is formed by oxidation of benzanthrone in sulfuric acid. The nitration of the resulting Bz-1:Bz-1'-dibenzanthronyl can be effected without isolation by the addition of nitric acid or other nitrating agent to the resulting sulfuric acid mass. The Bz-1:Bz-1'-dibenzanthronyl can be reduced to the amine and fused to the black dyestuff by any of the known processes.

A preferred process for carrying out the reduction and condensation without isolation is described in U. S. patent to Howell, 2,310,087. The nitration of the Bz-1:Bz-1'-dibenzanthronyl may be carried out in nitric acid or in a mixed sulfuric-nitric nitration acid.

Where Bz-1:Bz-1'-dibenzanthronyl is employed as the starting material, it may be dissolved in concentrated sulfuric acid and then the concentration of the acid adjusted to from 80% to 86% strength prior to addition of the nitrating agent. The preliminary solution of the dibenzanthronyl, however, is not imperative, for the mass can be suspended by agitation in the sulfuric acid of from 80% to 86% strength and then the nitric acid can be added. Under these conditions of nitration, the orientation of the nitro groups appear to be similar to that when the nitration is carried out in solvents such as described in Example 1 of U. S. P. 1,957,459, which on reduction and fusion, according to prior art methods, gives a very desirable black vat dye.

The temperatures at which nitration is carried out may also be varied within reasonable limits. While the nitration is preferably carried out at ordinary atmospheric temperatures, somewhat elevated temperatures may be employed, it being understood, of course, that the temperatures should not be sufficiently high as to cause excessive oxidation.

The following examples are given to illustrate the invention. The parts used are by weight.

*Example 1*

Dissolve one part of Bz-1:Bz-1'-dibenzanthronyl in 10 parts of 98% sulfuric acid at a temperature of about 30° C. When the intermediate is completely dissolved, cool the charge and drip in 1.8 parts of cold water at a temperature of about 30° C. After all of the water has been added, the charge should be about 83% sulfuric acid by analysis. Cool to about 20° C., and add slowly 0.5 part of 60% nitric acid at a temperature of about 20° C. After all of the nitric acid has been added, stir an additional 12 hours at 20° C. Drown the nitration mass in 60 to 80 parts of cold water and agitate for one hour. Filter and wash acid-free to Congo red test papers. Dry the material at 100° C. in a vacuum dryer. The dinitro-Bz-1:Bz-1'-dibenzanthronyl obtained will analyze about 4.0 to 4.5% nitrogen.

*Example 2*

Dissolve 150 parts of purified Bz-1:Bz-1'-dibenzanthronyl in 1500 parts of 98% sulfuric acid at about 25° C. When the intermediate is in solution, add 210 parts of water maintaining a temperature of about 20–30° C. At a temperature of about 20° C., add 70 parts of fuming nitric acid (98.5% nitric acid) slowly. Stir the charge overnight at room temperature, and drown in 6,000 to 8,000 parts of cold water. Filter and wash the cake acid-free with water. The nitro Bz-1:Bz-1'-dibenzanthronyl obtained will analyze about 4.9% nitrogen.

*Example 3*

Dissolve 200 parts of purified benzanthrone in 4,000 parts of 98% sulfuric acid. Cool and add 520 parts of water to cut the acidity to about 85% sulfuric acid. Cool this solution to 13° C. and add 160 parts of manganese dioxide over 2–3 hours at a temperature of 10–13° C. A microscopic examination will show rod-like crystals when the reaction is complete. For nitration, drip in 108 parts of 60% nitric acid over 4–5 hours and stir the nitration mass 16–18 hours allowing the temperature to rise to 20–25° C. Drown the reaction mass in 15,000 parts of water and allow it to settle. Syphon off the clear supernatant liquor from the mass, redilute with 15,000 parts of water, settle and again syphon off the supernatant liquid. Treat the slurry with 100 parts of sodium bisulfite dissolved in 500 parts of water. Boil the mixture and filter. Wash the filter cake acid-free and dry. This dinitro-Bz-1:Bz-1'-dibenzanthronyl will analyze about 4.7 to 4.9% nitrogen.

*Example 4*

Dissolve 100 parts of Bz-1:Bz-1'-dibenzanthronyl in 500 parts of 98% sulfuric acid at about 25–30° C. Drip in 60 parts of water at about 25–35° C. and agitate for one hour. Drip in 50 parts of 60% nitric acid at about 25–30° C. and agitate 16–18 hours at this temperature. With cooling add 500 parts of 25% oleum (105.6% sulfuric acid) below 60° C. Cool the solution to about 25–30° C. and sift in 22 parts of aluminum powder over 4–8 hours, aerating the mass during the addition of the aluminum powder. Stir the reaction for 12–18 hours longer, and drown in 5,000 parts of water heated to 50–60° C. When all the aluminum has dissolved, filter and wash the cake acid-free. A diamino-Bz-1:Bz-1'-dibenzanthronyl is obtained which contains 4.2% nitrogen.

*Example 5*

Dissolve 100 parts of dinitro-Bz-1:Bz-1'-dibenzanthronyl (prepared as in Example No. 1 or No. 2 above) in 1,000 parts of 98% sulfuric acid at 25–30° C. Add slowly over 7–8 hours, 22 parts of aluminum powder at about 28–30° C. Agitate the solution overnight at this temperature, drown in 6,000–8,000 parts of cold water and stir until the aluminum is dissolved. It may be necessary to warm to 40°–60° C. to dissolve all the aluminum. Filter off the reduction product and wash acid-free with hot water. A very good yield of a reduction product analyzing 4.35–5.1% nitrogen is obtained.

As illustrated in the above examples, the diamino dibenzanthronyl can be produced directly from benzanthrone without isolation of the intermediate products. Where the reduction is carried out without isolation of the dinitro derivative, it is desirable to use urea or sulfamic acid in the reaction to eliminate formation of the oxides of nitrogen.

The amount of sulfuric acid employed in the nitration step may vary within wide limits. A quantity should be employed which is insufficient to dissolve all of the Bz-1:Bz-1'-dibenzanthronyl. The amount of nitric acid employed may be varied depending on the amount of nitrogen desired to be introduced into the final product.

Besides being able to combine the various steps of oxidation and reduction in the same medium in which the nitration is carried out, this process offers the further advantage that a cheap and readily-available solvent can be employed in the nitration step. By the use of sulfuric acid, the amount of nitric acid required to effect the desired nitration is reduced to approximately ¼ or ⅕ of that required in carrying out the nitration in organic solvents.

As further illustrated in the examples, where sulfuric acid is employed as the nitration medium, reduction of the nitro derivative to the corresponding amine can be effected without isolation of the intermediate product.

I claim:

1. In the process for preparing dinitro-Bz-1:Bz-1'-dibenzanthronyl, the step which comprises reacting Bz-1:Bz-1'-dibenzanthronyl with nitric acid in sulfuric acid of from 80% to 86% strength, the amount of sulfuric acid employed being insufficient to effect complete solution of the Bz-1:Bz-1'-dibenzanthronyl.

2. In a process for preparing dinitro-Bz-1:Bz-1'-dibenzanthronyl, wherein Bz-1:Bz-1'-dibenzanthronyl is prepared by oxidation of benzanthrone in sulfuric acid of from 80% to 86% strength, the step which comprises carrying out the nitration of the resulting Bz-1:Bz-1'-dibenzanthronyl in the sulfuric acid solution without isolation.

CLIFFORD E. CARR.